United States Patent [19]

Hosaka et al.

[11] Patent Number: 5,553,288
[45] Date of Patent: Sep. 3, 1996

[54] CONTROL DEVICE FOR IMAGE FORMING APPARATUS

[75] Inventors: Masao Hosaka, Sagamihara; Hisashi Sakamaki, Yokohama, both of Japan

[73] Assignee: Canon Kabushiki Kaisha, Tokyo, Japan

[21] Appl. No.: 400,483

[22] Filed: Mar. 8, 1995

Related U.S. Application Data

[63] Continuation of Ser. No. 26,090, Mar. 4, 1993, abandoned, which is a continuation of Ser. No. 793,291, Nov. 14, 1991, abandoned, which is a continuation of Ser. No. 518,232, May 7, 1990, abandoned, which is a continuation of Ser. No. 59,018, Jun. 8, 1987, abandoned.

[30] Foreign Application Priority Data

Jun. 13, 1986 [JP] Japan .................................. 61-138859

[51] Int. Cl.$^6$ ........................................ G06F 9/00
[52] U.S. Cl. ................ 395/650; 395/474; 364/230.2; 364/245.7; 364/DIG. 1
[58] Field of Search ........................ 395/800, 425, 395/650, 474; 364/230.2, 245.7, DIG. 1

[56] References Cited

U.S. PATENT DOCUMENTS

| | | | |
|---|---|---|---|
| 3,444,525 | 5/1969 | Barlow et al. | 364/200 |
| 3,614,745 | 10/1971 | Podvin et al. | 395/650 |
| 3,648,253 | 3/1972 | Mullery et al. | 395/650 |
| 3,771,141 | 11/1973 | Cullu | 364/200 |
| 3,980,992 | 9/1976 | Levy et al. | 395/375 |
| 4,318,173 | 3/1982 | Freedman et al. | 364/200 |
| 4,323,966 | 4/1982 | Whiteside et al. | 364/200 |
| 4,333,144 | 6/1982 | Whiteside et al. | 364/200 |
| 4,354,262 | 10/1982 | Guézou et al. | 370/58.2 |
| 4,356,546 | 10/1982 | Whiteside et al. | 364/200 |
| 4,387,427 | 6/1983 | Cox et al. | 364/200 |
| 4,414,624 | 11/1983 | Summer | 395/650 |
| 4,493,019 | 1/1985 | Kim et al. | 364/200 |
| 4,509,851 | 4/1985 | Ippolito et al. | 364/200 |
| 4,562,535 | 12/1985 | Vincent et al. | 364/200 |
| 4,570,217 | 2/1986 | Allen et al. | 364/900 |
| 4,799,146 | 1/1989 | Chauvel | 395/325 |
| 4,870,704 | 9/1989 | Matelan et al. | 364/200 |
| 4,928,234 | 5/1990 | Kitamura et al. | 395/425 |
| 5,168,566 | 12/1992 | Kuki | 395/650 |

FOREIGN PATENT DOCUMENTS

| | | |
|---|---|---|
| 3432524A | 4/1985 | Germany . |
| 2146816 | 4/1985 | United Kingdom . |

OTHER PUBLICATIONS

H. Huse, "Multi–Mikrocomputer–System Modular Aufgebaut", Elektronik–Sonderheft (special edition) No. 54, pp. 58–66 (1982).

*Primary Examiner*—Alyssa H. Bowler
*Assistant Examiner*—John Harrity
*Attorney, Agent, or Firm*—Fitzpatrick, Cella, Harper & Scinto

[57] ABSTRACT

A control device for an image forming apparatus with plural loads includes plural execution units for executing plural processes in accordance with at least one of a plurality of programs stored in the program memory, a monitor unit for controlling an image forming sequence and monitoring process operations of plural control execution units in accordance with at least one plurality of programs, an input unit for inputting data required for the operations of the plural control execution units, a system bus to which the system execution units in the monitor access, and a memory unit, contents of which can be read out and written in by the plural execution units and monitor unit, wherein the monitor unit and the plural control execution unit access a system bus in a time-divisional manner such that the monitor unit and the plural control execution unit is prepared to be operated in turn, and the monitor unit selects fewer of the execution units when a task to be allocated requires faster processing and wherein the monitor unit determines the task to be executed in the image forming sequence, identifies an idle control execution unit and allocates the determined task to the idle control execution unit for execution.

11 Claims, 12 Drawing Sheets

| COP 0 LOCAL SPACE | COP 1 LOCAL SPACE | ⋯ | COP 9 LOCAL SPACE |

FIG. 6A

| REGISTER/TIMER | PWM 0~3 | AD/C 0~7 |

FIG. 6B

| I/O BANK 0 | I/O BANK 1 | I/O BANK 2 | I/O BANK 3 |

CONTROL DEVICE FOR IMAGE FORMING APPARATUS

This application is a continuation of application Ser. No. 08/026,090 filed Mar. 4, 1993, now abandoned, which was a continuation of application Ser. No. 07/793,291 filed Nov. 14, 1991, now abandoned, which was a continuation of application Ser. No. 07/518,232 filed May 7, 1990, now abandoned, which was a continuation of application Ser. No. 07/059,018 filed Jun. 8, 1987, now abandoned.

BACKGROUND OF THE INVENTION

1. Field of the Invention

The present invention relates to a control device for controlling an image forming apparatus provided with plural loads.

2. Related Background Art

The widespread application of microcomputers in various devices in recent years has significantly contributed to the improvement in its performance, and this tendency is expected to further increase in the future. These changes rely on the advance of semiconductor technology and the cost reduction in the resulting chips. The improvement in the performance of such devices has resulted in an increase in the number of microcomputers used, and the amount of software therefor is drastically increasing year after year. In fact, the manpower required for the development of microcomputer equipment is principally occupied by the development of software, and the development of software has become a bottleneck in the period required for equipment development. This is generally referred to as the so-called "software crisis".

Semiconductor chips, being very inexpensive, are being employed in larger numbers in order to increase the added value of the equipment. Consequently the hardware is becoming simpler and improved in performance, but the software is unable to catch up to the hardware. Further, programming has to be started anew in case of a design change of the product. Though the computer sequence provides the user with a system with large flexibility, software design is extremely difficult. For this reason various equipment is now being designed on commercially available operation systems (OS). However, stand-alone office automation equipment is not large enough as to justify the use of such commercially available real-time operation systems, which are in fact inefficient in terms of the program capacity.

Figure 8:
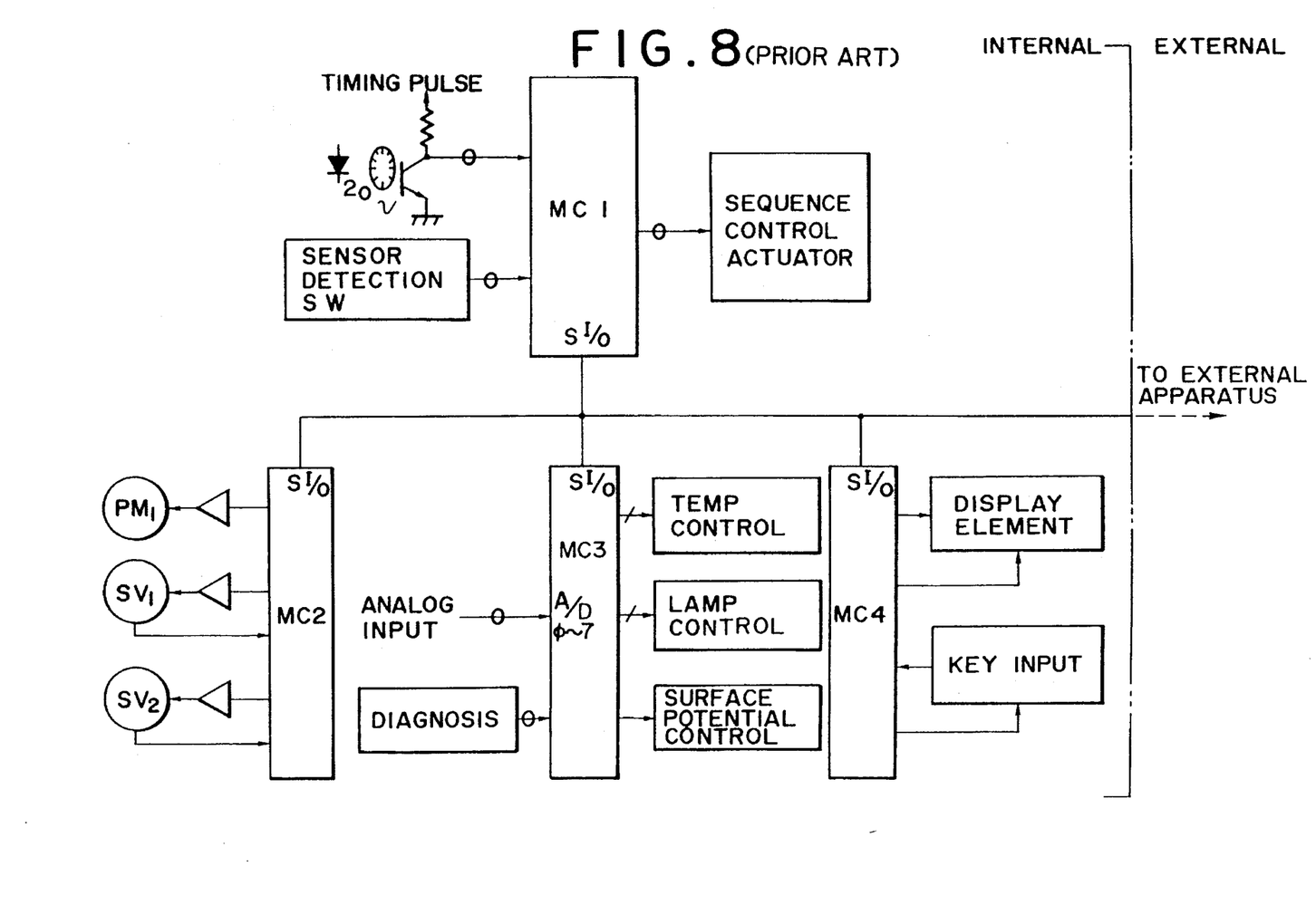
FIG. 8 is a block diagram of a conventional control device.

Despite the fact that the period for development is always too short because of the increasingly shorter life cycle of the products, the software or application program developed for any particular equipment is usually not utilized in the succeeding development. This is basically due to the conventional architecture of the microcomputers. FIG. 8 illustrates the hardware structure of a conventional control system for a mechanical-electronic equipment such as a copying machine, employing four one-chip microcomputers MC1–MC4. For this purpose, an 8-bit microcomputer NEC u-COM87AD is often used, having various I/O ports, a 4-Kbyte ROM and 128-byte RAM on a single chip, because of satisfactory cost performance.

The microcomputers MC1–MC4 control the interior of the apparatus, but each has an external serial input/output port (SI/O) for enabling comunication with external accessories through a bus-line. In the case of a copying machine, the external accessories include a sorter, collator, automatic document feeder (ADF), copy charge counter etc. which are optionally added to the copying machine. In the illustrated structure, the microcomputer MC1 is a host processor principally for sequence control of the apparatus, and controls by counting the timing pulses with a counter and comparing the number of said pulses with the address numbers of the ROM, and setting or resetting suitable actuators such as solenoids, clutches, motors etc. required for the sequence control. Also it receives signals for sequence control, from sensors and detecting switches.

The microcomputer MC2 principally controls servo motors and stepping motors. In case of a copying machine there are usually employed a few stepping motors for lens movement, sheet feeding, movement of an original support table etc., while the servo motors are employed for driving a photosensitive drum, and an optical scanner system. The microcomputer MC3 controls analog input and output signals, representing temperature, light intensity, humidity and surface potential, and also performs diagnosis of the entire equipment. These input signals, received in analog from, are converted into digital signals by A/D converters on the chip.

The microcomputer MC4 principally controls the display element, such as light-emitting diodes(LED), liquid crystal display(LCD) devices, fluorescent display tubes etc. of the display panel, and controls the signal inputs from key switches.

Such a multi-processor system is featured by a good cost performance in comparison with using one-chip microcomputers, but is associated with a drawback of complexity of protocol and communication software among the microcomputer chips. Also the communication among the microcomputers is not necessarily smooth because the serial input/output ports incorporated in these chips are often not fast enough and require a long idling time.

More specifically, in the case of data transmission to a slave microcomputer designated by the host microcomputer, all the slave microcomputers connected to the host microcomputer receive an interruption command, and suspend all the jobs in order to confirm the address of the command. A particular microcomputer, having confirmed that the command is addressed to it, starts to receive the data. Naturally said microcomputer is unable to do other jobs during such interruption procedure, and the situation is the same for the host microcomputer. Therefore, in the course, for example, of a precise servo control, the slave microcomputer refuses any data reception except for urgent signals, by sending a busy signal to the host microcomputer.

In this manner the conventional control device has required program development for each model of the equipment, and the program has to be complex in order to achieve advanced performance. Further, efficient control is difficult with plural processors due to an increased idling time. For resolving these drawbacks the present applicant has already proposed various systems as disclosed in U.S. patent application Ser. No. 795,229 filed Nov. 5, 1985, now Ser. No. 244,638 filed Sep. 12, 1988 now U.S. Pat. No. 4,980,814, issued on Dec. 25, 1990; Ser. No. 836,239 filed Mar. 4, 1986 now abandoned; Ser. No. 893,915 filed Aug. 6, 1986 now U.S. Pat. No. 4,811,052, issued on Mar. 7, 1991.

SUMMARY OF THE INVENTION

In consideration of the above-mentioned drawbacks in the prior technology, an object of the present invention is to provide a control device, for an image forming apparatus, allowing simplification of program preparation, re-use of the already existing programs and execution of plural processes in parallel manner.

More specifically, an object of the present invention is to provide a control device, for an image forming apparatus, comprising plural control execution units and a monitor unit for monitoring the operations of said plural control execution units, wherein said motor unit allocates necessary processes to said plural control execution units thereby achieving efficient image forming control.

Another object of the present invention is to provide a control device, for an image forming apparatus, wherein said monitor unit executes processes requested by said control execution units thereby enabling high-speed processing in said control execution units.

The foregoing and still other objects of the present invention, and the features and advantages thereof, will become fully apparent from the following detailed description which is to be taken in conjunction with the appended drawings.

DETAILED DESCRIPTION OF THE PREFERRED EMBODIMENTS

[Basic concept]

Figure 1:
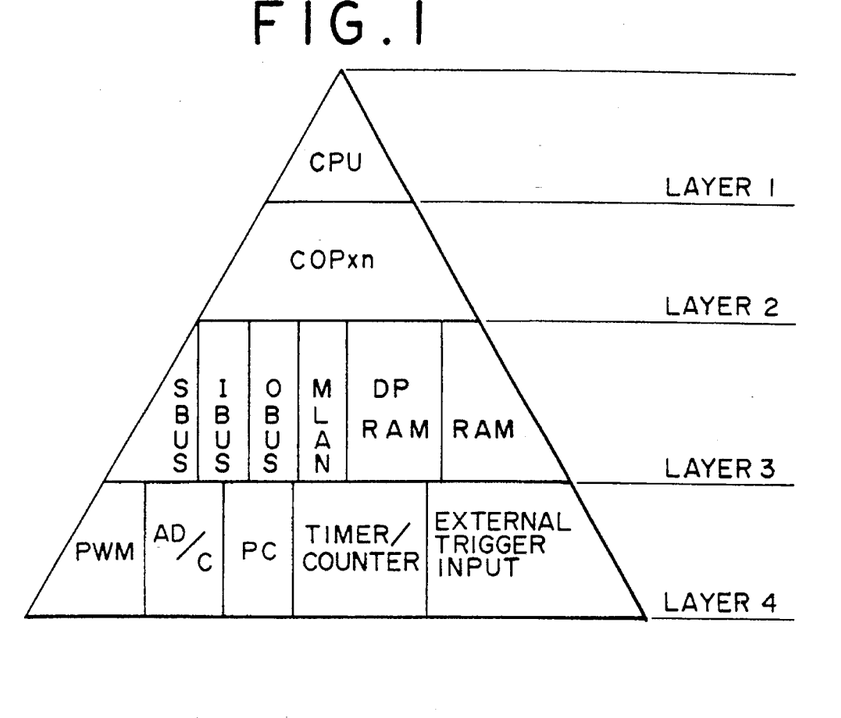
FIG. 1 is a conceptual view of the architecture of the control device of the present invention.

FIG. 1 is a conceptual view of the control device embodying the present invention, wherein a top layer 1 has an administration CPU (monitor unit) which controls the entire equipment but does not execute application tasks. It principally monitors and administers control execution units or co-processors (COP), and controls the execution of the operation system (OS). Also it executes, upon request, fast calculations that cannot be conducted by the co-processors and helps the execution of other COP's when they are busy. A layer 2 has plural channels of COP's, for example 10 channels in case of a copying machine, for executing predetermined tasks under the control of the CPU. Each COP may be assigned to a fixed task, but is flexibly assigned to various tasks occurring from time to time, under the control of the CPU. A layer 3 has random access memories (RAM) and buses for communication with the CPU, COP's and an external input/output memory. S-Bus is an ordinary system bus for memory, I/O addresses and data, as found in usual microprocessors. I-bus is a particular emulator (ICE) bus directly connected with the CPU. O-bus is an exclusive bus for I/O port expansion, as will be explained later, for enabling exclusive interface of a COP with a particular register under the control of the CPU. u-LAN is a serial communication line for data exchange under a predetermined protocol. A dual port RAM (DPRAM) is principally used for data exchange between the CPU and the COP's. In an emergency, each COP may call the CPU through an interruption procedure and ask the CPU to fetch the data, but it is also possible to check data by periodic search of the RAM areas under the control of the operation system. RAM is an ordinary scratch pad memory accessible for the CPU and COP's. A layer 4 includes peripheral input/output devices required for mechanical-electronic control, such as a pulse width modulator PWM, an analog-to-digital converter AD/C, and a phase comparator PC for servo motor, adaptable for a phase locked loop control with a programmable frequency and therefore usable for a variable-speed DC motor with PLL control. The reference signal for said phase comparator is supplied from an internal 16-bit timer/counter.

The timer/counter is provided with a timer for generating said reference signal, square waves and one-shot pulses, and a counter for receiving external pulses. An external trigger input port receives a signal from a zero-cross pulse detector, a counter start signal, an AD/C start signal etc. The peripheral I/O devices can achieve effective control of a mechanical-electronic device in combination with the COP's.

Figure 2:
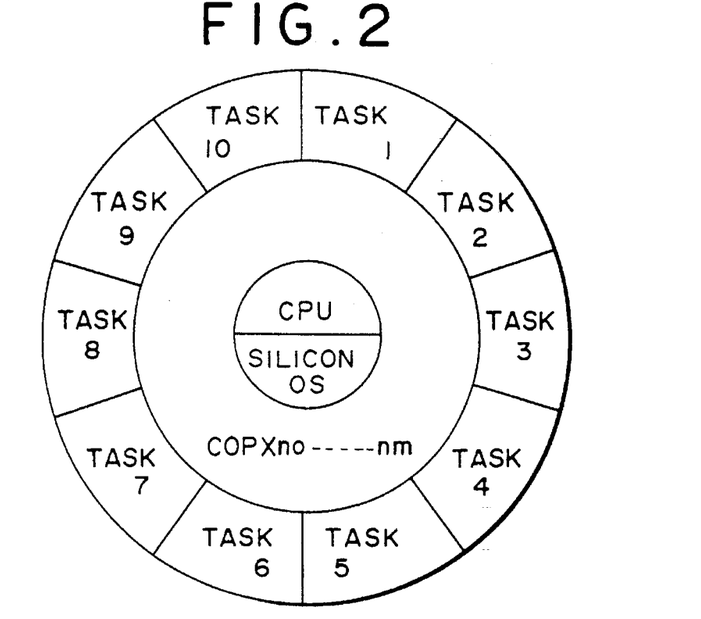
FIG. 2 is a chart showing the relationship of host processor (CPU), co-processors (COP) and tasks.

FIG. 2 illustrates the relationship of CPU, COP's and tasks, wherein tasks 1 to 10 are executed by the COP's under the control by a silicon operation system. In FIG. 2 the COP's are not fixed to particular tasks but are flexibly allocated to all the tasks under the control of the CPU.

Figure 3:
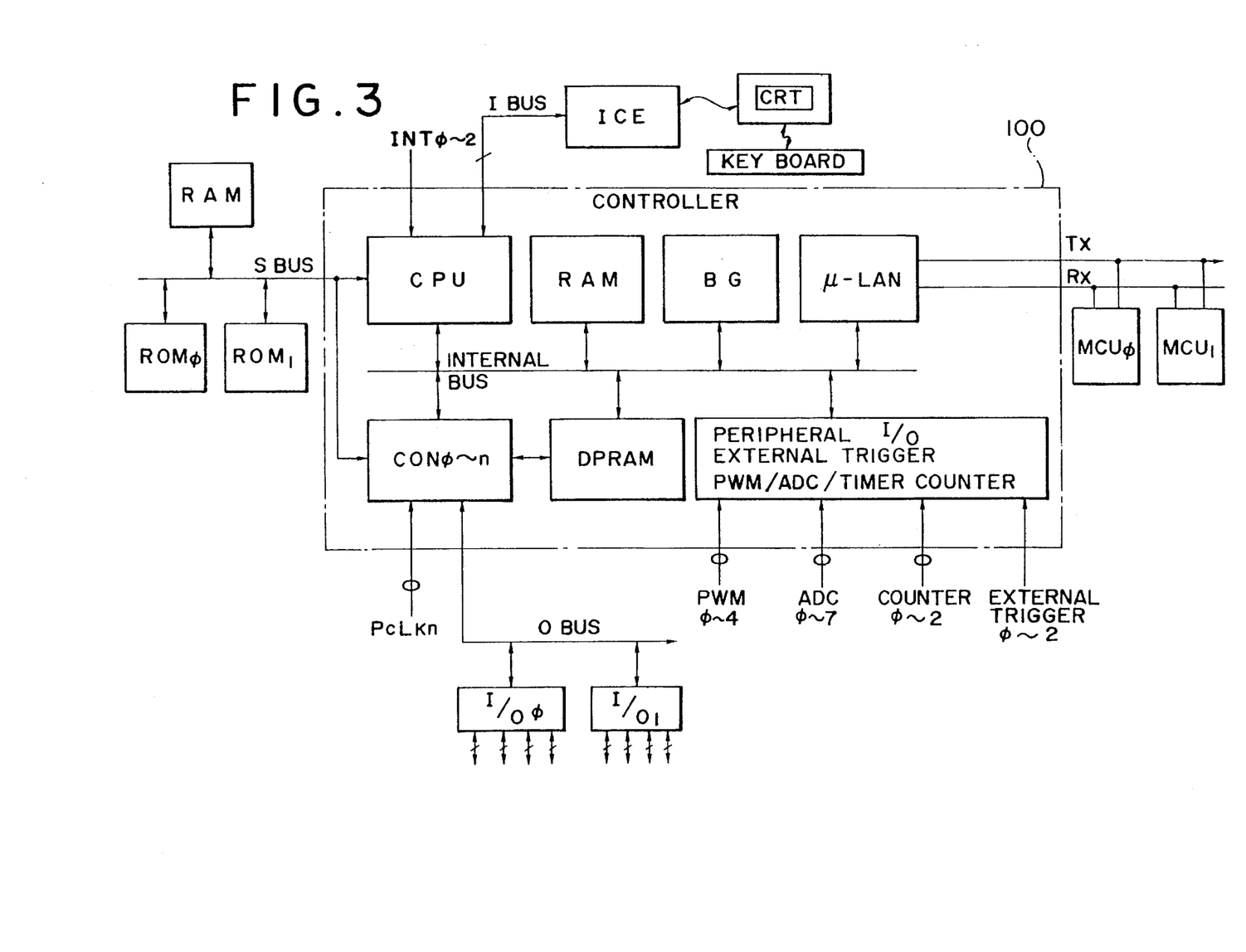
FIG. 3 is a control block diagram of an embodiment of the present invention.
Figure 4:
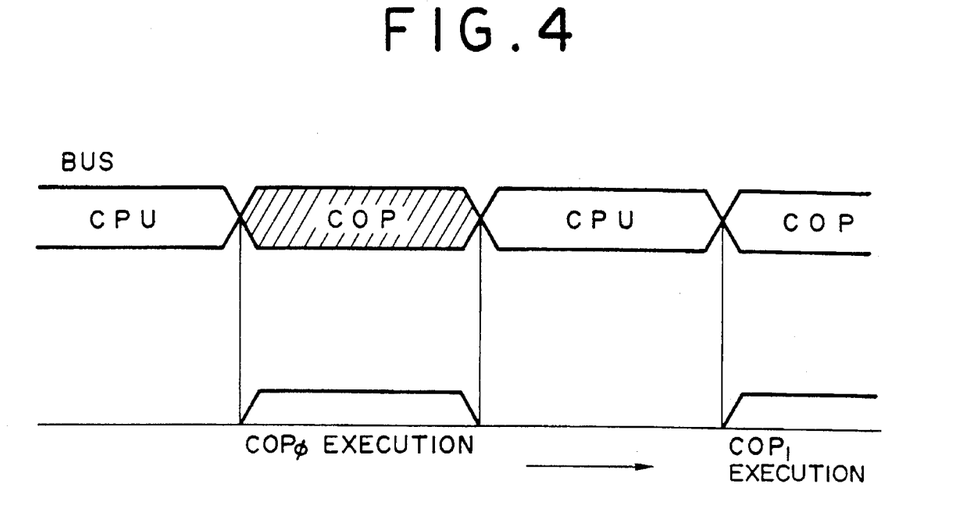
FIG. 4 is a timing chart showing the use of the bus by the CPU and COP's.

FIG. 3 is a block diagram of the control device 100 embodying the present invention, particularly illustrating the relationship with the outside. Component parts of the control device 100 are formed on the same semiconductor substrate. An exclusive in-circuit emulator (ICE) bus IBUS is connected directly to the CPU and is used for system debugging. The CPU principally executes tasks specific to the operation system as a monitor, and is therefore capable of releasing the contents of the registers of accumulator (ACC) to the outside through the IBUS on real time basis. Since the actual tasks in the present system are conducted by the COP's, the CPU is assigned only the tasks of the operation system and has enough marginal time. Therefore, different from the conventional ICE, the CPU is capable of real-time emulation. The S-bus is same as the conventional system bus, but further features accessibility by the COP's as well as by the CPU. The CPU and the COP's seem to function independently but utilize a common bus on a time-sharing basis, as shown in FIG. 4, illustrating the alternate mode of use by the CPU and the COP's. In practice the COP cycles are allocated in the empty cycles of the CPU, and for this reason, the COP's are designed to use relatively simple commands compared with those of the CPU. Also because of this fact the commands involving complex operations (multiplication and division) are executed by the CPU as explained before.

Figure 5:
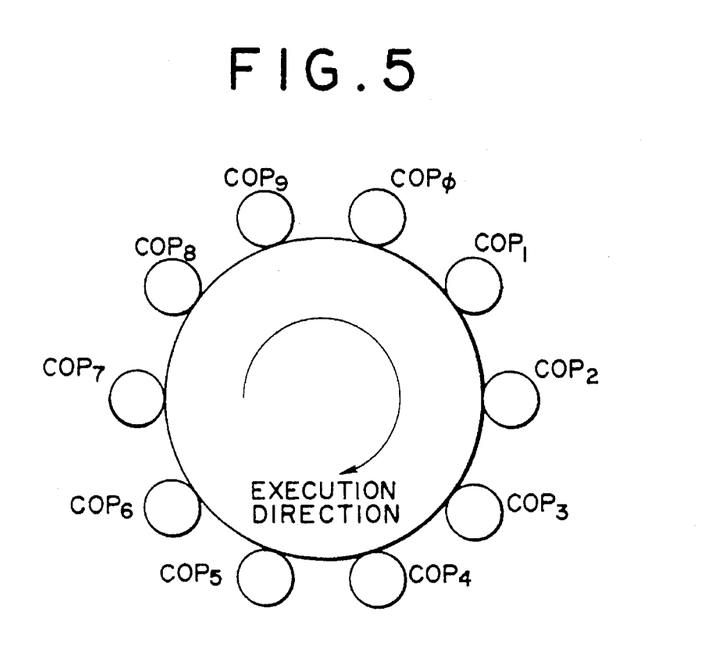
FIG. 5 is a chart showing the order of execution of the COP's.

FIG. 5 illustrates the sequence of execution of 10 channels of the COP's, wherein the bus is alternately used. Since the COP's share the bus alternately with the CPU, the execution speed of each COP becomes lower as the number of the COP's increases. Therefore, if a higher execution speed is required for a certain task, it is possible to use, for example, two channels COP0, COP1 only and to stop all other COP's as long as permissible. The COP's to be operated are selected and started by the CPU, according to the processing status of external loads. Again referring to FIG. 3, a bus OBUS exclusive for I/O expansion is directly connected to the COP's, so that the COP's can independently operate the I/O port depending on the task allocation. Clock signals PcLKn for example of 4 channels are supplied to the COP's and entered into respective counters thereof. Said signals are counted for controlling the timing sequences and the external devices. A serial line u-LAN can be assigned to a COP according to the protocol determined in the system. A baud rate generator BG is provided with a 16-bit timer, which can be set to a suitable value to generate various baud rates. Said baud rate generation can be controlled by a selected one of the COP's.

3-channel external interruption ports INT0—2 are connected to the CPU, with priorities which become higher in the order from 0 to 2.

Other microcontrollers MCU0, 1 are connected to the line U-LAN and are synchronized by the serial I/O. [Memory map]

Figure 6A:
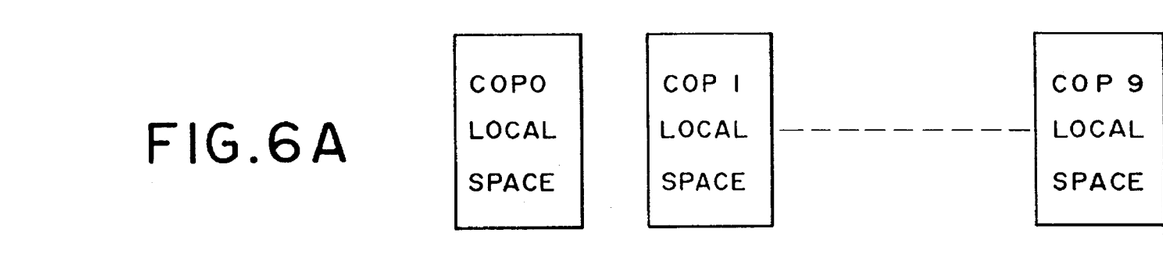
FIGS. 6A to 6C are views of memory mapping.
Figure 6B:
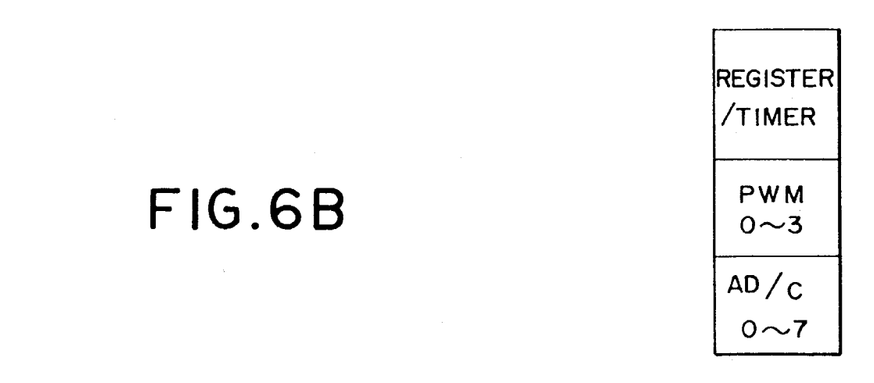
Figure 6C:
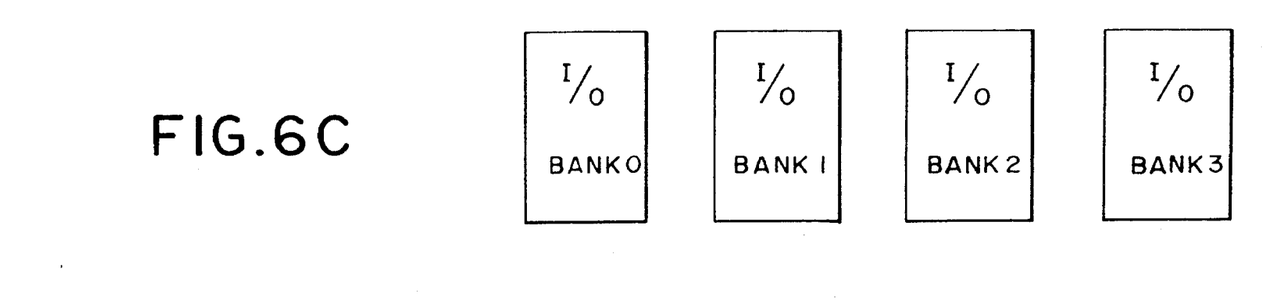

FIGS. 6A to 6C illustrate the memory map of the controllers, showing the address relationship between the CPU and the COP's of 0–n channels. There are provided local spaces, shown in FIG. 6A, respectively accessible by the COP's which are independent processors like the CPU, and common spaces, shown in FIGS. 6B and 6C, accessible by all the COP's. The local space is used for the program counter, different flags, 16-bit counter etc. of each COP, and is formed in the internal RAM. The common spaces shown in FIGS. 6B and 6C are used for peripheral registers, RAM and external I/O spaces. The external I/O spaces (I/O bands 0–3) are connected to the external expansion port bus, so that the access to said spaces enables data exchange with I/O connected to the external I/O port. The CPU can also make access to said spaces through a "window" shown in FIG. 7. In addition the CPU can make access to the local spaces of the COP's and the memory spaces shown in FIG. 6B.

In summary each COP can make access to its own local space and the common spaces, while the CPU can make access to all the local spaces and the common spaces.

In this manner the CPU and the COP's can make access to any of these spaces, and the local spaces are divided into areas respectively exclusive to the COP's. The access to the external I/O space is made through the "window" register from the CPU but directly from the COP's, so that the input into and output from said space can be achieved with write and read commands.

Figure 7:
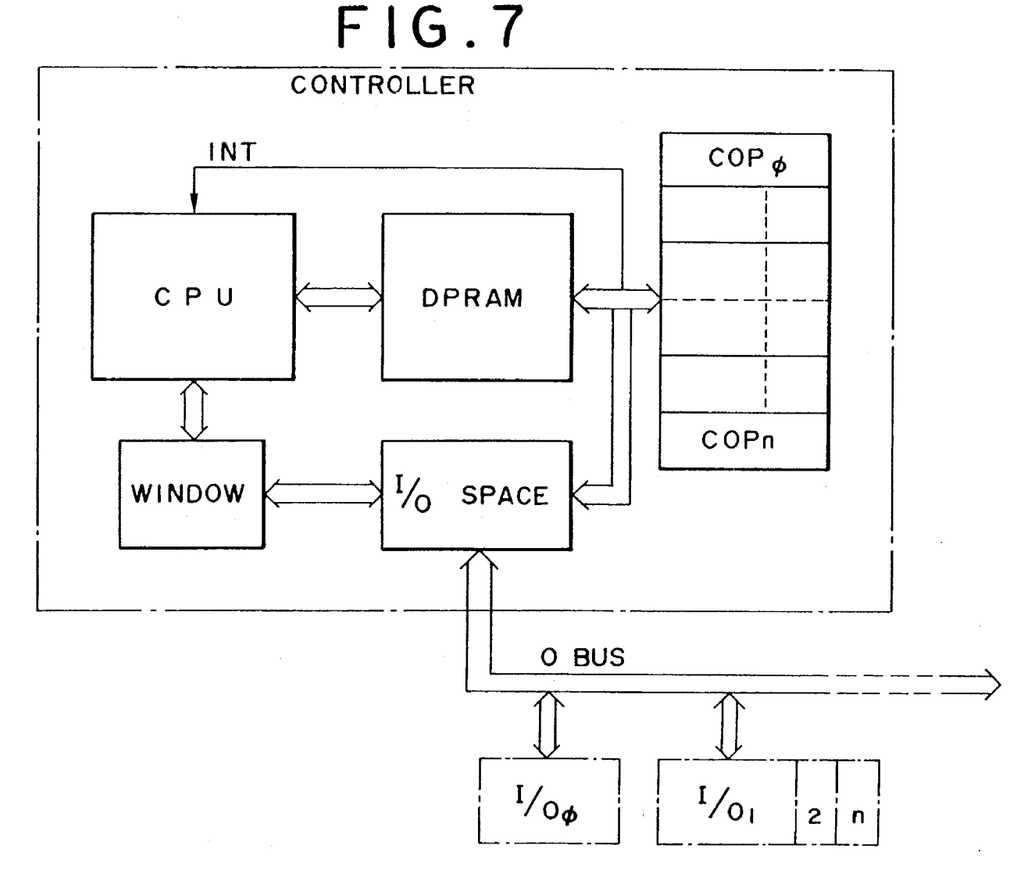
FIG. 7 is a block diagram of an interface between the CPU and the COP's.

FIG. 7 shows the mode of communication between the CPU and the COP's. The access to the internal data RAM provided in the dual port RAM (DPRAM) and to the CPU from the COP's can be made by an interruption procedure. The access to the external I/O space can be made, as already explained before, through the window register from the CPU and directly from the COP's. The status of the COP's can be known by monitoring the registers in the common spaces shown in FIG. 6A. Also each COP requests, according to the program thereof, an interruption of the CPU, in order to inform the CPU of a change in its status. A feature of the present system is that the CPU and the COP's are independent processors functioning in an asynchronous manner and yet still can make access to the same memories. The possibility of writing in the same memory address by different processors, common in a multi-processor system with a common memory, is prevented by the hardware structure as already explained in relation to FIGS. 4 and 5.

In the following there will be explained an equipment control process utilizing the real-time multi-task processor explained above. [Control block diagram]

Figure 9:
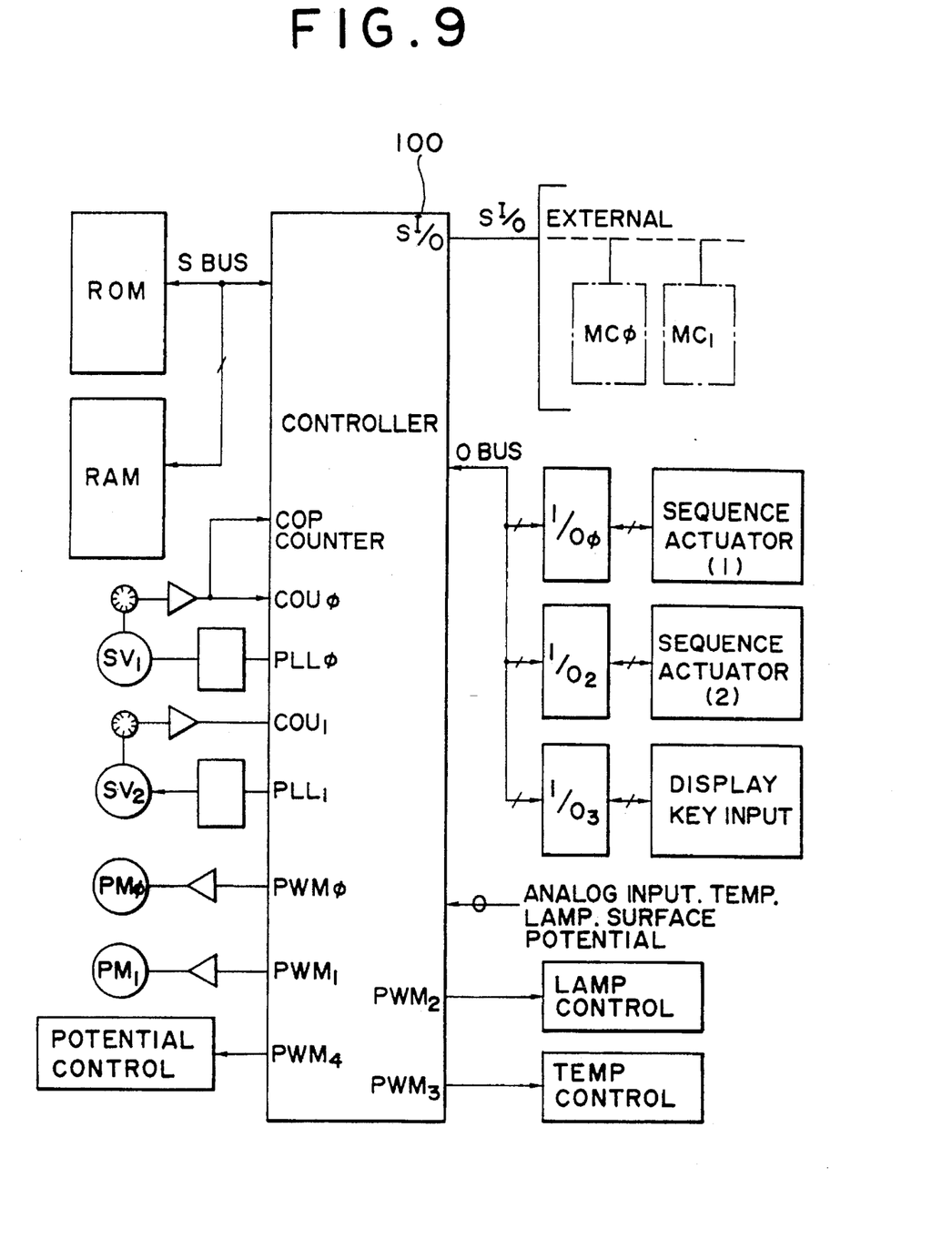
FIG. 9 is a block diagram of a control device embodying the present invention.

FIG. 9 is a control block diagram of a copying machine, which employs the above-explained control device and which is free from the drawbacks of the conventional multi-processor system.

A control device 100 shown in FIG. 9 has the same architecture as explained in relation to FIGS. 1 and 3. The servo motor, stepping motors, light intensity of lamp, temperature and surface potential are controlled by an intelligent I/O explained before, and the control tasks are executed by the COP's designated by the CPU. As already explained, the O-bus is connected to various actuators for sequence control, thus setting and resetting the loads.

Also the display devices and the input keys are connected to said O-bus and are controlled by a particular COP.

Figure 10:
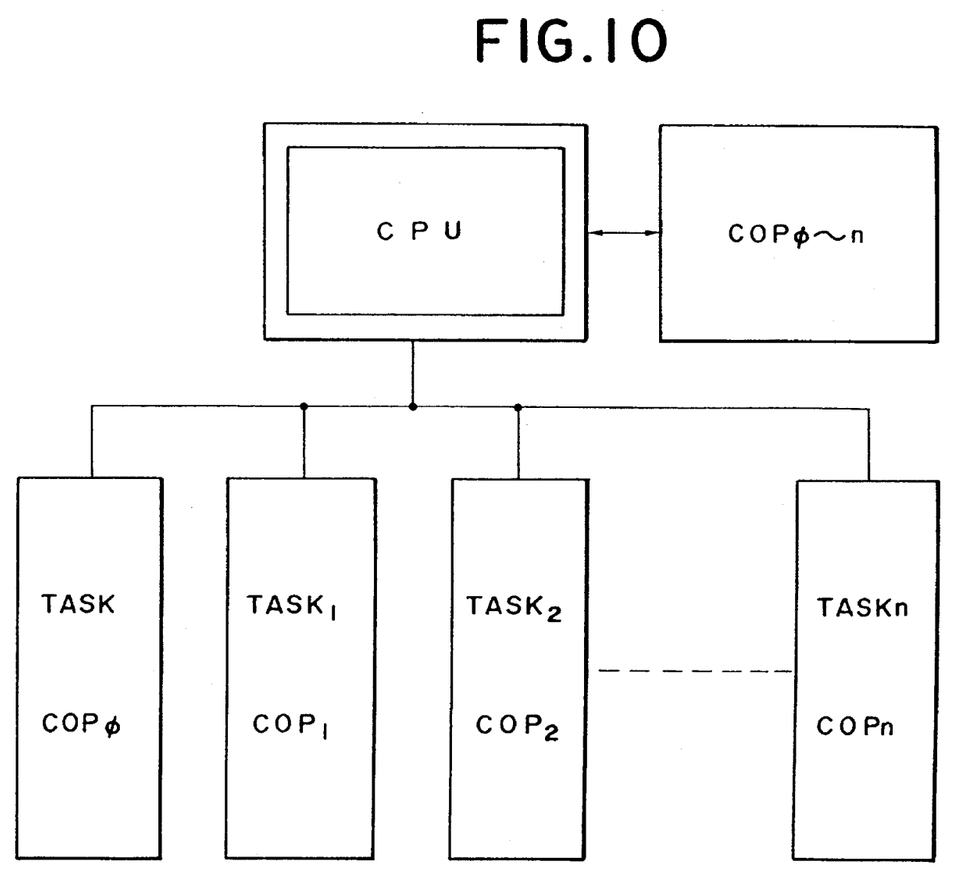
FIG. 10 is a chart showing the relationship between task allocation by the CPU and the COP's.

FIG. 10 illustrates the allocation of tasks by the CPU. In FIG. 10 a task 0 corresponds to the COP0, but in practice the newly generated tasks are allocated in succession to the empty COP's by the CPU. Upon detection of a new event, the CPU formulates a new task and activates a COP which has not been active. Also upon completion of a task, the CPU releases the corresponding COP from said task and maintains said COP in idle state. In this manner the CPU determines the allocation of the COP's for each new task, and starts and stops the COP's according to the current status. [Function flow chart of CPU]

Figure 11A:
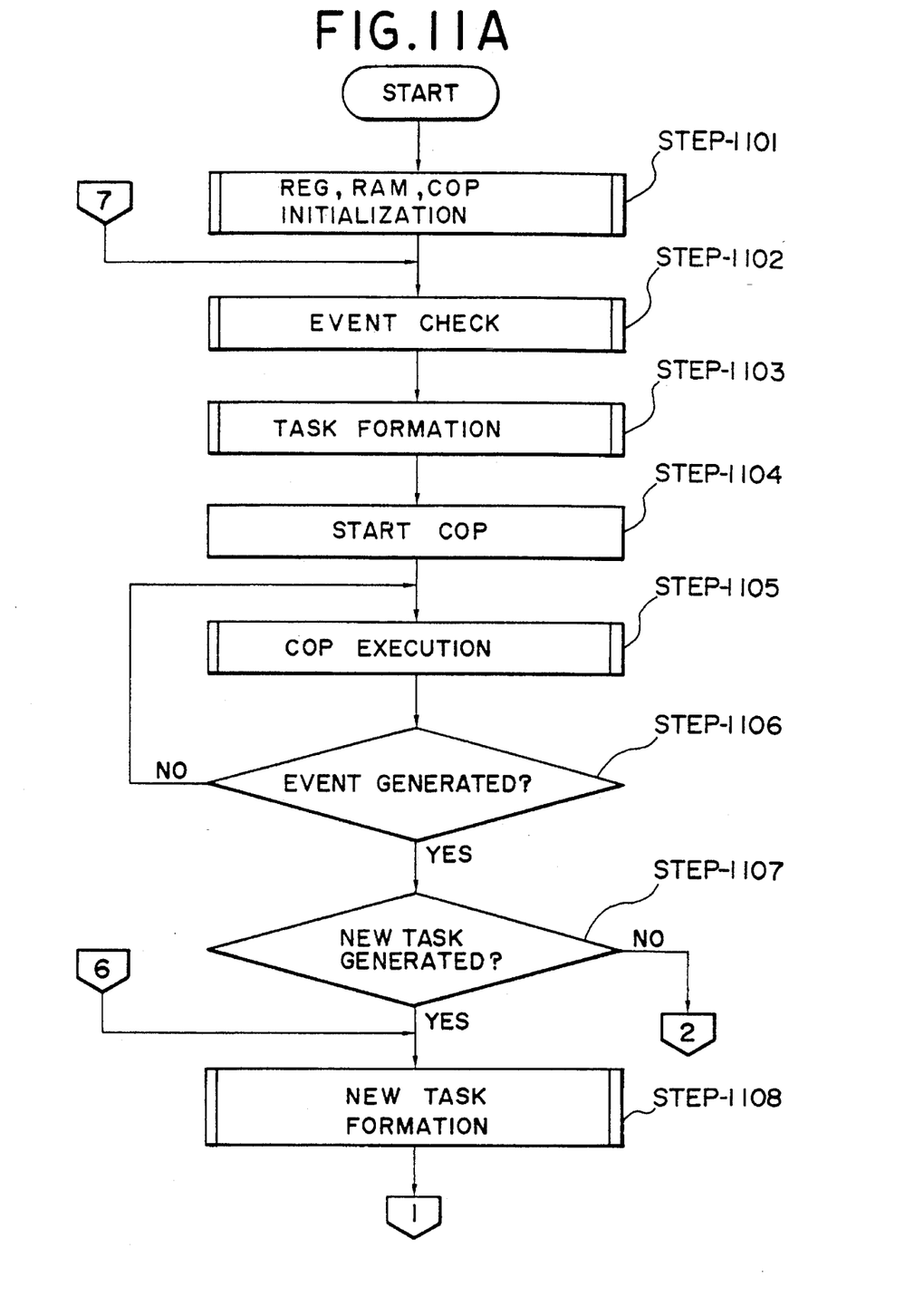
FIGS. 11A to 11F are general flow charts of the CPU.
Figure 11B:
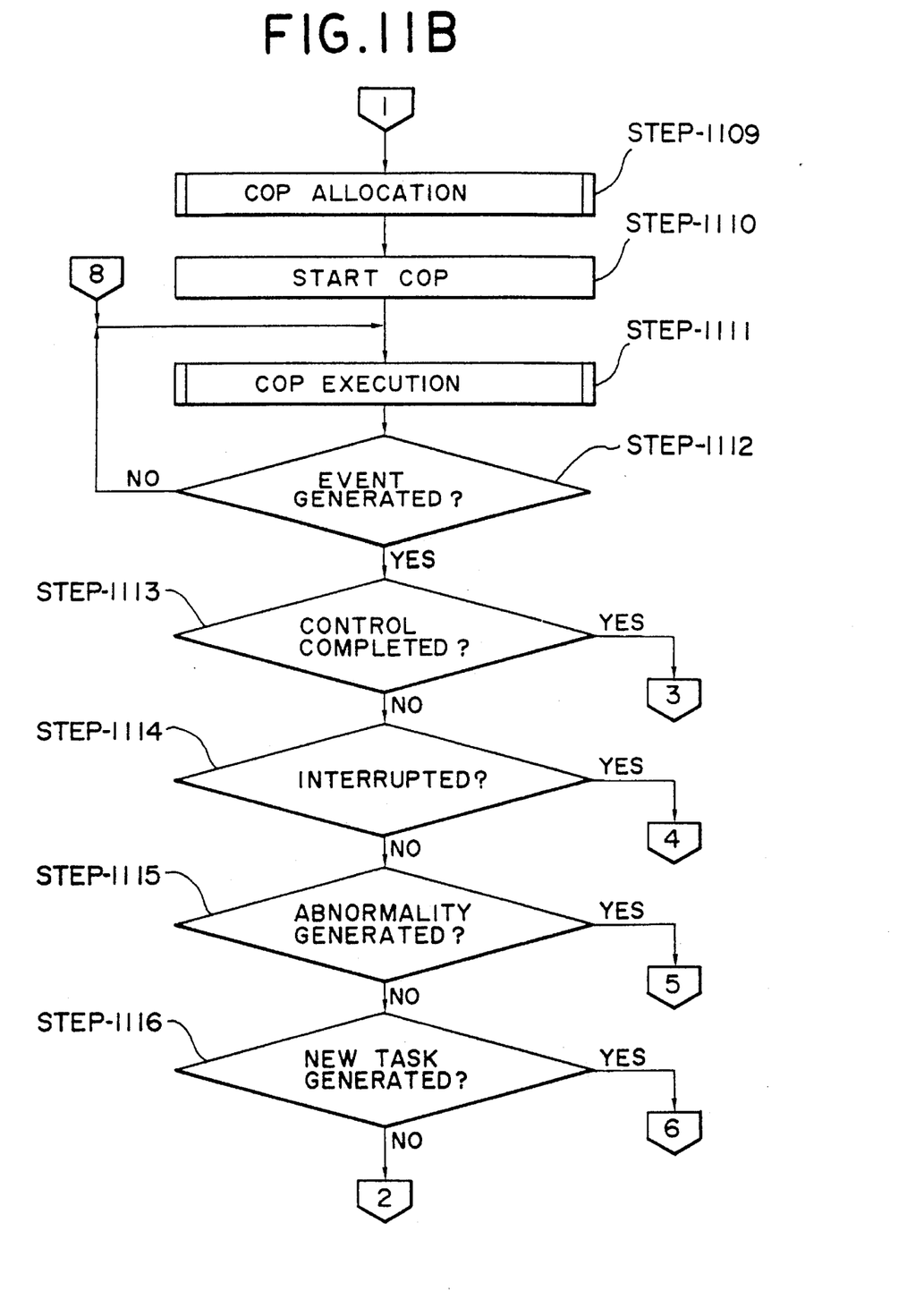
Figure 11C:
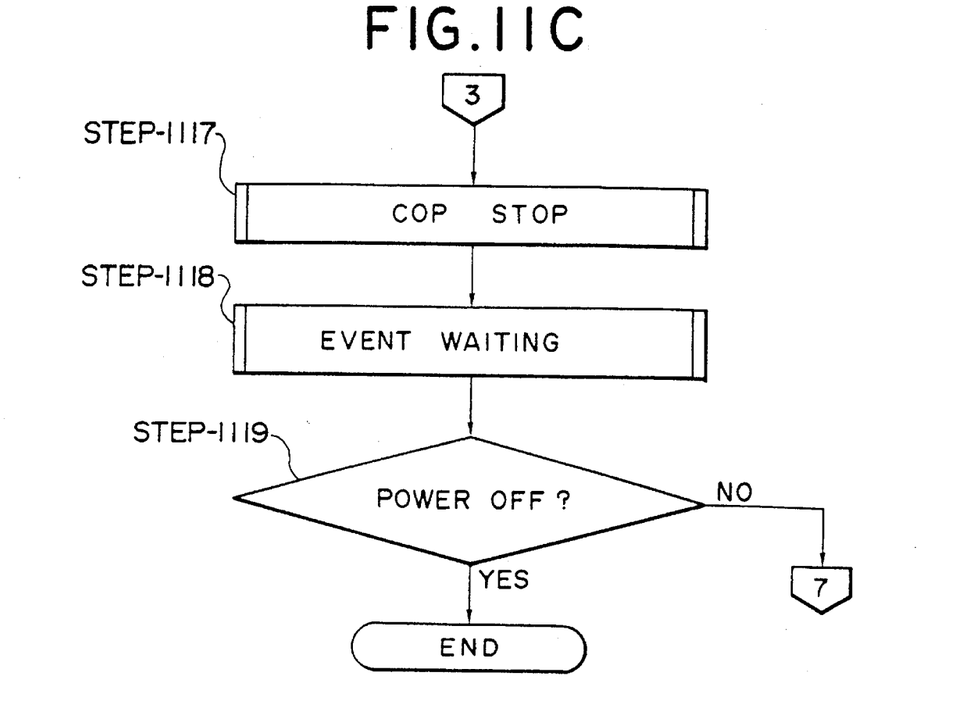
Figure 11D:
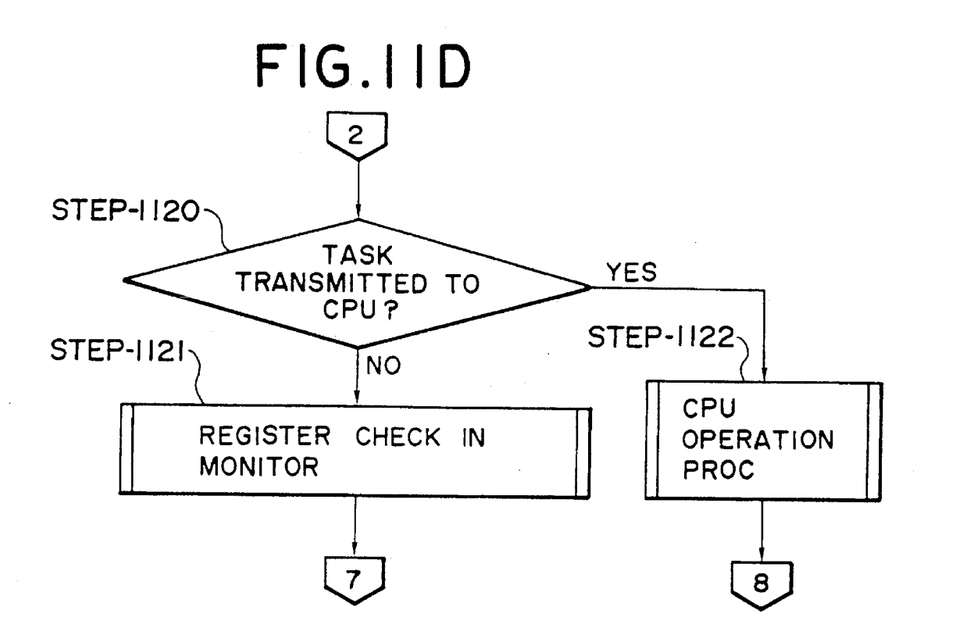
Figure 11E:
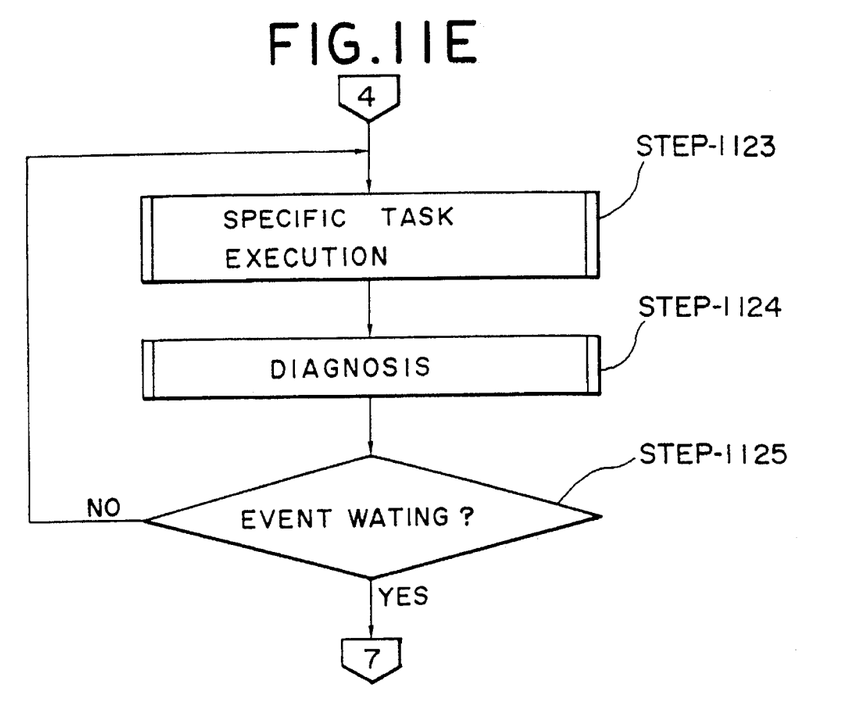
Figure 11F:
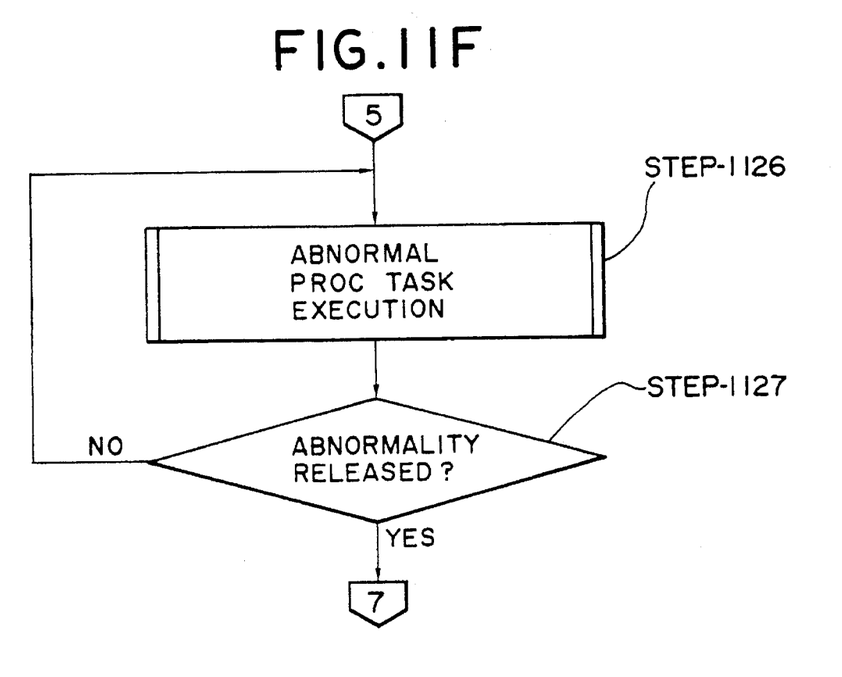

In the following there will be explained the function of the CPU as the monitor, according to the general flow chart shown in FIGS. 11A–11F:

Step-1101: The CPU initializes the registers, RAM and COP's,

Step-1102: The CPU checks events, and identifies the starting point in case of a sequence and content of execution, from the contents of registers and key inputs.

Step-1103: Necessary tasks are formulated according to the event.

Step-1104: A COP assigned to the task is activated.

Step-1105: The activated COP executes the task.

Step 1106: The CPU monitors the generation of a new event, including a task generated by a sequence when external key inputs or timing pulses reach a predetermined value.

Step-1107: The CPU tests whether a new task is generated, discriminating whether a new task becomes necessary by the generation of a new event in the step-1106.

Step-1108: The CPU formulates the new task.

Step-1109: A COP is assigned to the new task.

Step-1110: Said COP is activated.

Step-1111: Said COP executes the predetermined process.

Step-1112: The CPU tests for a new event.

Step-1113: The CPU identifies whether all the control operations have been completed.

Step-1114: The CPU tests whether an interruption of the control has been requested.

Step-1115: The CPU tests the presence of any abnormal situation.

Step-1116: The CPU tests whether a new process task is required.

Step-1117: Upon completion of all the tasks, the CPU instructs the COP to stop.

Step 1118: The CPU awaits a new event, and, upon generation thereof executes a predetermined procedure.

Step-1119: The sequence is terminated if the power supply is turned off.

Step-1120: A check is conducted as to whether a task is to be transferred from a COP to the CPU. A fast or complex operation that cannot be processed by the COP is transferred to the CPU, in response to a request from the COP to the CPU.

Step-1121: If such transfer to the CPU is not necessary, the CPU monitors the functions of the COP's by checking the registers in the monitor.

Step-1122: The CPU executes an operation transferred from a COP in response to a request therefrom.

Step-1123: The CPU executes a task in response to the newly generated event. Said execution is conducted either by changing the function of an already functioning COP, or by activating another COP. In this case an interruption procedure is executed as the currently executed procedure is interrupted by an internal or external cause.

Step-1124: A diagnosis is conducted in order to investigate the reason of interruption.

Step-1125: Said process task is executed until the instruction for interruption is cancelled. If a new event is generated, the program jumps to the step-1102 to execute a new task.

Step-1126: An abnormality procedure task is executed, for example by cutting off the power supply or stopping motors according to the level of the abnormality. Under certain circumstances, a new task is generated in this step-1126 to activate another COP.

Stp-1127: A test is conducted as to whether the abnormality situation is cancelled, and, if cancelled, the program jumps to the step-1102 for formulating a new task.

As explained in the foregoing, the control device of the present invention for an image forming apparatus is featured by the fact that plural coprocessors are provided in a single chip, and that the CPU performs a function as monitor for administering the task execution of said coprocessors, formulating tasks in response to the events, allocating said tasks to the coprocessors and executing complex processes in response to the requests from said coprocessors.

The above-explained structure enables parallel processing of plural tasks.

Also it enables re-use of already existing programs, since the program can be prepared for each task.

Furthermore said structure facilitates program preparation for the monitor unit.

Furthermore each co-processor can exclusively execute the task and achieve a high-speed processing since complex processing can be transferred to the monitor unit.

The present invention is not limited to the foregoing embodiment but is subject to variations and modifications within the scope and spirit of the appended claims.

What is claimed is:

1. A control device for an image forming apparatus with plural loads, comprising:

a program memory for storing a plurality of programs;

plural control execution units, COP0, COP1, COP2 . . . COPn, for executing plural processes in accordance with at least one of the plurality of programs stored in said program memory;

a monitor unit, CPU, for controlling an image forming sequence and monitoring processing operations of said plural control execution units in accordance with at least one of the plurality of programs stored in said program memory;

an input unit for inputting data required for the operations of said plural control execution units;

a system-bus to which said plural control execution units and said monitor unit access; and a memory unit, contents of which can be read out and written in by said plural control execution units and said monitor unit, said memory unit having a plurality of dedicated memory areas to which said plural control execution units access, respectively, and wherein said monitor unit can access each of the dedicated memory areas of the memory unit, wherein said monitor unit and said plural control execution units access said system-bus in a time-divisional manner such that said monitor unit and said plural control execution units appear to be operated in turn such that an order of access to the system bus is CPU—COP0—CPU—COP1—CPU . . . COPn, and said monitor unit selects fewer of said execution units when a task to be allocated requires a quick processing response time, wherein said monitor unit determines tasks to be executed in the image forming sequence, identifies an idle control execution unit and allocates the determined tasks to the idle control execution unit for execution, and wherein said monitor unit communicates with said plural execution control units by accessing said plurality of dedicated memory areas.

2. A control device according to claim 1, wherein said monitor unit is adapted to allocate the determined tasks in accordance with the data entered by said input unit.

3. A control device according to claim 1, wherein said monitor unit is adapted to control when said plural control execution units start and stop.

4. A control device according to claim 1, wherein said monitor unit is adapted to execute a part of the processes of said plural control execution units in response to a request from each of the plural control execution units in the case one of the plural requesting control execution units cannot perform a function of the allocated task.

5. A control device according to claim 4, wherein said monitor unit is adapted to allocate the determined tasks in accordance with the data entered by said input unit.

6. A control device according to claim 4, wherein said monitor unit is adapted to control when said plural control execution units start and stop.

7. A control device according to claim 4, wherein said monitor unit and said plural control execution units operate on a time sharing basis.

8. A control device according to claim 4, further comprising an output unit for outputting operation control information for the plural loads, wherein each of said plural control execution units executes its allocated task to control said one of the plural loads based at least partially on the operation control information.

9. A control device according to claim 8, wherein said control execution units, said monitor unit, said output unit and said input unit are formed on the same semiconductor substrate.

10. A control device according to claim 1, further comprising an output unit for outputting operation control information for the plural loads, wherein each of said plural control execution units executes its allocated task to control said one of the plural loads based at least partially on the operation control information.

11. A control device according to claim 10, wherein said control execution units, said monitor unit, said output unit and said input unit are formed on a semiconductor substrate.

* * * * *